(12) United States Patent
Wredenhagen et al.

(10) Patent No.: US 7,142,729 B2
(45) Date of Patent: Nov. 28, 2006

(54) SYSTEM AND METHOD OF SCALING IMAGES USING ADAPTIVE NEAREST NEIGHBOR

(75) Inventors: G. Finn Wredenhagen, Toronto (CA); Sam Leung, Scarborough (CA); Lance Greggain, Woodbridge (CA)

(73) Assignee: Jaldi Semiconductor Corp., Richmond Hill (CA)

( * ) Notice: Subject to any disclaimer, the term of this patent is extended or adjusted under 35 U.S.C. 154(b) by 673 days.

(21) Appl. No.: 10/106,060

(22) Filed: Mar. 27, 2002

(65) Prior Publication Data

US 2003/0185463 A1   Oct. 2, 2003

Related U.S. Application Data

(63) Continuation-in-part of application No. 09/948,819, filed on Sep. 10, 2001, now Pat. No. 6,788,353.

(51) Int. Cl.
*G06K 9/32* (2006.01)
*H04N 1/46* (2006.01)

(52) U.S. Cl. ....................... 382/300; 358/525

(58) Field of Classification Search ........ 382/298–300; 358/1.2, 525, 528; 348/426.1, 581, 447–448; 708/300
See application file for complete search history.

(56) References Cited

U.S. PATENT DOCUMENTS

| | | | | |
|---|---|---|---|---|
| 4,603,350 A | * | 7/1986 | Arbeiter et al. | 348/448 |
| 4,805,129 A | * | 2/1989 | David | 708/300 |
| 5,559,905 A | * | 9/1996 | Greggain et al. | 382/298 |
| 5,594,676 A | * | 1/1997 | Greggain et al. | 708/300 |
| 5,598,217 A | * | 1/1997 | Yamaguchi | 375/240.21 |
| 5,818,964 A | * | 10/1998 | Itoh | 382/205 |
| 5,852,470 A | * | 12/1998 | Kondo et al. | 348/448 |
| 6,144,409 A | * | 11/2000 | Han et al. | 348/426.1 |
| 6,348,929 B1 | * | 2/2002 | Acharya et al. | 345/660 |
| 6,563,544 B1 | * | 5/2003 | Vasquez | 348/447 |
| 6,788,353 B1 | * | 9/2004 | Wredenhagen et al. | 348/581 |

* cited by examiner

*Primary Examiner*—Kanjibhai Patel
(74) *Attorney, Agent, or Firm*—Marger Johnson & McCollom P.C.

(57) ABSTRACT

A method for interpolating a target pixel from a plurality of source pixels in a high contrast image. The method comprises the following steps. A window of the plurality of source pixels is examined and compared with a plurality of predefined conditions for determining if a structure of significance is present within the window. A filter configuration is selected from a plurality of filter configurations in accordance with results of the comparison. The selected filter is applied to the source pixels for interpolating the target pixel. If the structure of significance is detected in the window, the selected filter best preserves the structure.

12 Claims, 7 Drawing Sheets

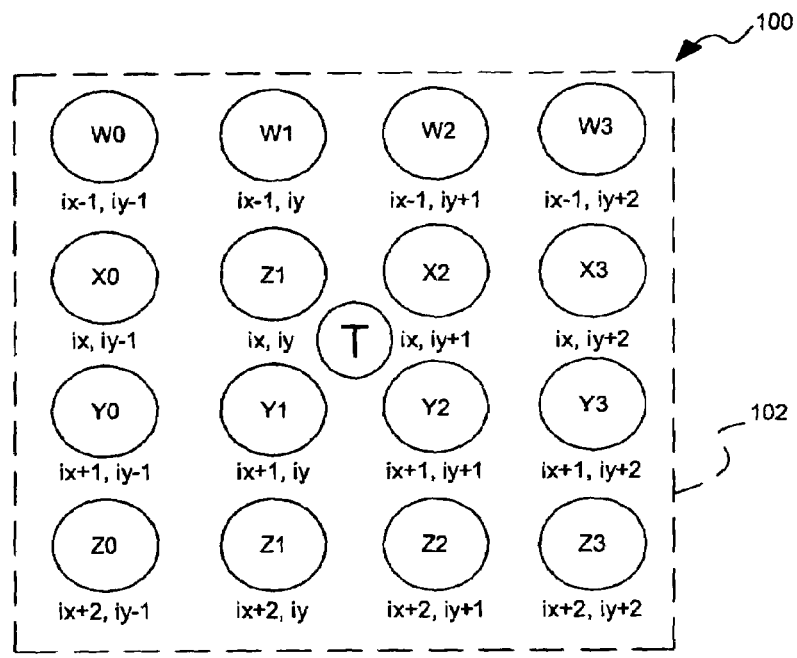
Figure 1
  
  
  
Figure 2　　　Figure 3　　　Figure 4

Figure 5    Figure 6    Figure 7
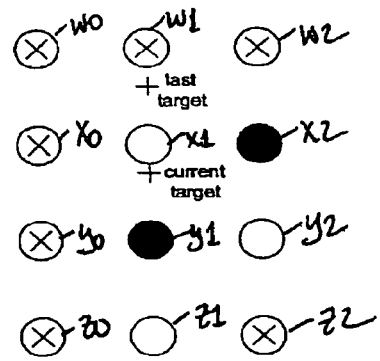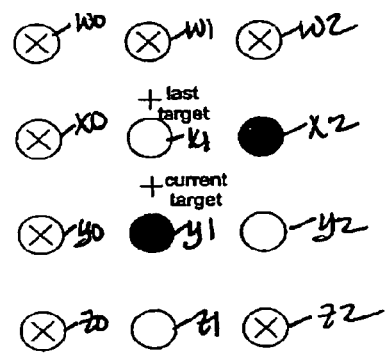
Figure 8    Figure 9

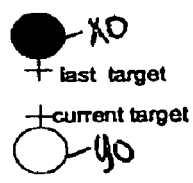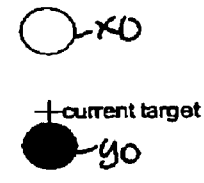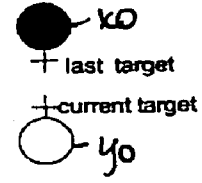
Figure 24    Figure 25    Figure 26
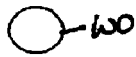
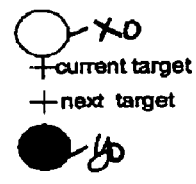
Figure 27    Figure 28

SYSTEM AND METHOD OF SCALING IMAGES USING ADAPTIVE NEAREST NEIGHBOR

This appilcation is a continuation-in-part of and claims priority to U.S. patent application Ser. No. 09/948,819, filed Sep. 10, 2001, now U.S. Pat. No. 6,788,353, issued Sep. 7, 2004, which, in turn, claims priority to Canadian patent application No. 2,317,870, filed Sep. 8, 2000.

The present invention relates generally to a system and method for resizing images, and specifically to a system and method for resizing high contrast images.

BACKGROUND OF THE INVENTION

Scaling an image well is generally challenging. When zooming, fine structures in the image such as lines and edges need to be preserved, and an apparent resolution of the enlarged image must not be degraded when examined closely by a human observer. Satisfying these basic requirements is difficult, especially for a computer graphics image.

A main difficulty in scaling computer graphics images arises because the human observer is sensitive to structures with high contrast as well as an amount of weight or energy in structures of high contrast. Text, for example, contains abrupt edges and line segments, which are combined to form a letter. Similarly, a computer graphics image is likely to contain abrupt edges when a structure is placed on a background of a different colour. Transitions between these regions are often defined by immediate changes in colour and intensity. When such images are enlarged it is very important to preserve the high contrast appearance of the original image.

Linear filtering usually does an adequate job of maintaining the amount of weight or energy in a structure of high contrast but does a poor job at maintaining the structures themselves. Traditionally, resizing an image has often been done using linear techniques. A Finite Impulse Response (FIR) filter of polyphase design is used to compute interpolated pixels in the scaled image. The scaled image can be either larger or smaller than the source image. The process by which the target image is generated from the FIR filter is known as convolution. Unfortunately, the result is not often visually satisfactory, because linear filters cannot reproduce, or preserve, with sufficient accuracy, high contrast structures such as edges tat reside in many images that are generated by a computer. For instance, using a linear filter that is too "sharp ", that is, it has significant high frequency gain, will result in a target image that is prone to exhibit "ringing". This type of phenomenon is referred to as Gibbs effect. Gibbs effect manifests itself in a target image as a visual echo or ripple that surrounds the structure in question. Alternately, if the filter is too "soft", that is, it has more high frequency attenuation the resulting target image will be perceived as blurry. For example, edges are rounded off. Neither a soft nor a sharp linear filter is adequate.

In order to preserve local contrast in the image, scaling using a nearest neighbour algorithm is sometimes used. The nearest neighbour algorithm replicates the value of the pixel nearest in location to the location of the interpolated pixel. The algorithm preserves structures with high contrast, but often results in images that appear blocky when large resize factors are involved. Further, at smaller resize factors, the nearest neighbour algorithm can lead to finer image structures, such as text, to appear as mixed bold and standard fonts depending on the exact position of the target pixel during interpolation. In either case, the result is not visually pleasing.

Therefore, there is a need to provide a scaling algorithm that preserves edges in high contrast images, while reducing the visually displeasing effects of doing so. Thus, it is an object of the present invention to obviate or mitigate at least some of the above-mentioned disadvantages.

SUMMARY OF THE INVENTION

In accordance with an aspect of the present invention there is provided a method for interpolating a target pixel from a plurality of source pixels in a high contrast image. The method comprises the following steps. A window of the plurality of source pixels is examined and compared with a plurality of predefined conditions for determining if a structure of significance is present within the window. A filter configuration is selected from a plurality of filter configurations in accordance with results of the comparison. The selected filter is applied to the source pixels for interpolating the target pixel. If the structure of significance is detected in the window, the selected filter best preserves the structure.

BRIEF DESCRIPTION OF THE DRAWINGS

Embodiments of the invention will now be described by way of example only with reference to the following drawings in which:

FIG. 1 is a block diagram of a pixel window for use in vertical interpolation of a target pixel;

FIGS. 2–28 are block diagrams illustrating select predetermined patterns possible within the pixel window illustrated in FIG. 1;

DETAILED DESCRIPTION OF THE PREFERRED EMBODIMENTS

Figure 10:
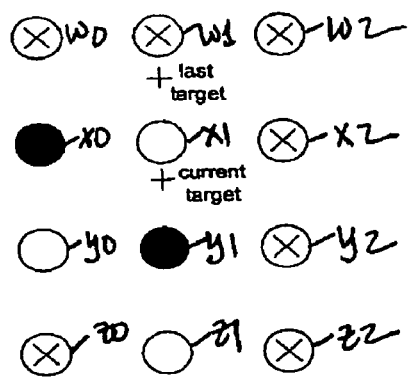

For convenience, like numerals in the description refers to like structures in the drawings. An adaptive nearest neighbour (ANN) algorithm is designed to resize high contrast images such as computer-generated images, web pages and computer graphics with text. The ANN algorithm is an adaptive non-linear algorithm that examines surface structure in order to compute a target pixel.

The basic ideas behind the ANN algorithm is as follows. During image resizing (either enlargement or reduction), a target pixel position is computed relative to a plurality source pixels. Pixels in an image are arranged in a grid comprising rows and columns. The number of rows and columns in an image depends on the image resolution. Source pixels refer to pixels in the image being scaled and target pixels refer to pixels in a resulting scaled image. When enlarging, the step size is less than the distance between source pixels. That is, every source pixel is bound by two target pixels that are closer than the next closest source pixel. This is true because separable interpolation in vertical and horizontal directions forces the target pixel to be co-linear with the rows (when interpolating horizontally) and co-linear with the columns (when interpolating vertically). The target pixel nearest to the source pixel containing an edge, corner, or structure of significance as determined by a decision engine is used to preserve the edge. The target pixel is computed by filtering the surrounding source pixels.

Thus, the ANN algorithm examines surface structure in a pixel window (or decision window) about the target pixel position and applies a variable length filter. The decision engine DE determines sues within the image. In order for this to occur, heuristics are used that examine the pixels in the pixel window in order to determine whether or not there are any important structures prior to interpolation.

In the present embodiment, the adaptive nearest neighbour ANN algorithm uses a 4×4 decision window for vertical interpolation and a 4×1 decision window for horizontal interpolation. While the present embodiment is designed to operate on windows of these sizes, a person skilled in the art will appreciate that the algorithm can be adapted to apply to larger window sizes in which longer filters can be applied. It has been determined during experimentation that the window sizes used in the present embodiment and their associated rules provide good quality results for a large range of zoom factors.

If the target pixel lies directly between two vertically aligned source pixels, only vertical interpolation is required. If the target pixel lies directly between two horizontally aligned source pixels, only horizontal interpolation is required. Otherwise both horizontal and vertical interpolation are required. When an image requires both vertical and horizontal interpolation, it is preferable that the vertical interpolation is performed first. The decision is based on the green values of the Red Green Blue (RBG) values of the pixels.

Referring to FIG. 1, a decision window for vertical interpolation is illustrated generally by numeral 100. The decision window 100 comprises a four-by-four array of pixels 102 to which predefined rules are applied. The rows in the array, beginning with the first row, are represented by variables iy−1, iy, iy+1, and iy+2, respectively. The columns in the array, beginning with the first column, are represented by variables ix−1, ix, ix+1, and ix+2, respectively. The pixels in the first row are labelled W0 . . . W3, the pixels in the second row are labelled X0 . . . X3, the pixels in the third row are labelled Y0 . . . Y3, and the pixels in the fourth row are labelled Z0 . . . Z3.

In the present embodiment a target pixel T is illustrated between pixels X1, X2, Y1, and Y2. The position of the target pixel T can be shown to have a vertical component Fy and a horizontal component Fx. The vertical component Fy is the vertical distance from pixel X1, in the downward direction. The horizontal component Fx is the vertical distance from pixel X1, in the rightward direction. Therefore, both a vertical and a horizontal interpolation are required for interpolating the target pixel T.

Depending on the results of the decision engine, there are six possible filter configurations that can be applied to the decision window. The filter configurations either preserve X1, preserve Y1, apply a two-tap filter to X1 and Y1, apply a three-tap filter to W1, X1, and Y1, apply a three-tap filter to X1, Y1, and Z1, or apply a four-tap filter to W1, X1, Y1, and Z1.

The decision engine examines the pixel information on the green value of the RGB values of the pixels. Whatever is determined for the green value is repeated for red and blue. Alternately, the decision as to which filter configuration to implement is based on a surrogate luminance value Y composed of fractional components of the R, G and B channels. The reason for the surrogate Y value is as follows. If the edge threshold detection is used for one of the red, green or blue channels, and there is no edge in that channel, but an edge does exist in the other channels, it would not be detected. By relying on a linear combination of red, green and blue, all edges of sufficient magnitude in any channel is enough to trigger the edge rules.

Before the details of the decision engine are detailed, several conditions and variable used by the decision engine are described. A threshold is defined for determining whether or not an edge exists between two pixels. The threshold is programmable and its default value is set to 10. If the difference between two adjacent pixels exceeds the threshold, then an edge is present between the pixels. If the difference between two pixels does not exceed the threshold, the pixels are determined to be level.

The distance between adjacent pixels in the array, in either the vertical or horizontal direction is defined as one. Thus, since the vertical component Fy of the target pixel falls between X1 and Y1, the distance from the target pixel to X1 is a fraction. One is defined as the binary value of b 1 shifted left by a number of fraction bits PositionFractionBits. The number of fraction bits PositionFractionBits is a predefined variable. This definition is represented by the expression:

Unity=1<<PositionFracBits, where "<<" is a left shift operator

A midpoint between two source pixels is determined by taking the binary value of 1 and shifting it left by one less than the number of fraction bits PositionFractionBits. This definition is represented by the expression:

Midpoint=1<<(PositionFracBits−1)

A step size Ystep represents the distance between target pixels. That is, Ystep is equal to the difference between a previous target pixel and a current target pixel, as well as the difference between the current target pixel and the next target pixel.

Using the step size, Ystep., two other values are determined for later use in calculations. An immediately preceding (or previous) target pixel's y-position FyBehind is determined in accordance with the expression ((fy−Ystep) & positionWholeMask), where "&" represent a bit-wise AND function. FyBehind is the absolute value of the distance between the last target pixel and, in the present embodiment, X1. Thus, for example, if Fy=0.2 and Yste is 0.5, FyBehind=0.3. Also, an immediately following (or next) target pixel's y-position FyAhead is determined in accordance with the expression ((fy+Ystep) & positionWholeMask).

The use and definition of the FyBehind and FyAhead variables will become apparent when illustrated with reference to implementing the present embodiment. The variable positionWholeMask is determined by shifting the binary value of 1 left by the number of fraction bits PositionFractionBits and then subtracting 1. This definition is represented by the expression:

positionWholeMask=(1<<positionFracBits)−1

The decision engine calculates several Boolean variable for use in determining which filter configuration to select. Level variables are used for determining that there are no edges between adjacent pixels. That is, the absolute difference between adjacent pixel values is less than the threshold. Level variable are calculated for each adjacent pair of pixels in a column in accordance with the following relationships:

Level_$W1X1$=TRUE if abs($\Delta W1X1$)<=threshold

Level_$X1Y1$=TRUE if abs($\Delta X1Y1$)<=threshold

Level_$Y1Z1$=TRUE if abs($\Delta Y1Z1$)<=threshold

Level_$Y1X0$=TRUE if abs($\Delta Y1X0$)<=threshold

Level_$Y1X2$=TRUE if abs($\Delta Y1X2$)<=threshold

That is, for example, Boolean variable Level_W1X1 is set to TRUE if the absolute value of the difference between pixel values for W1 and X1 is less than or equal to the threshold.

Similarly, edge variables are used for determining when an edge is present between adjacent pixels. Edge variables are calculated as follows:

Edge_$W1X1$=TRUE if abs($\Delta w1x1$)>threshold

Edge_$X1Y1$=TRUE if abs($\Delta x1y1$)>threshold

Edge_$Y1Z1$=TRUE if abs($\Delta y1z1$)>threshold

Edge_$Y1Y0$=TRUE if abs($\Delta y1y0$)>threshold

Edge_$Y1Y2$=TRUE if abs($\Delta y1y2$)>threshold

That is, for example, Boolean variable Edge_W1X1 is set to TRUE if the absolute value of the difference between pixel values in Green for W1 and X1 is greater than the threshold.

A hybrid filtering variable HybridFiltering determines whether or not to implement hybrid filtering. Hybrid filtering is used to preserve a feature such as a line that is a single pixel wide. That is, for any scale factor, the width of the source feature is preserve. This variable is programmable and its default value is set to False. An increase in pixel intensity variable Up_X1Y1 is used for determining whether the pixel intensity has increased from X1 to Y1. Up_X1Y1 is set to true if Y1>X1. Otherwise it is set to false. Similarly, a decrease in pixel intensity variable Down_X1Y1 is used for determining whether the pixel intensity has decreased from X1 to Y1. Down_X1Y1 is set to true if X1>=Y1. Otherwise it is set to false.

The following algorithm describes predefined patterns against which the decision window is compared as well and the resulting filter configuration that is selected for each case. Due to the way in which the algorithm is implemented (case-like structure), the order of the patterns can be significant. Therefore, it is preferable that they are compared with the decision window in the order as listed below.

Referring to FIG. 2, a first pattern is illustrated. In the present pattern, the pixels W1, X1, Y1, and Z1 are all level. Since all pixels are level, it does not matter whether the target pixel is closer to X1 or Y1. As a result, a four-tap filter is applied to pixels W1, X1, Y1, and Z1. This case is determined by the Boolean expression:

Level_W1X1 && Level_X1Y1 && Level_Y1Z1

Referring to FIG. 3, a second pattern is illustrated. In the present pattern, the target pixel is closer to X1 than Y1 and the edge is detected between pixels Y1 and Z1. Since the target pixel is located between to level pixels and away from the edge, a three-tap polyphase filter is applied to the level pixels W1, X1, and Y1. This case is determined by the Boolean expression:

(Level_W1X1 && Level_X1Y1 && Edge_Y1Z1)
&& (fy<=Midpoint)

Referring to FIG. 4, a third pattern is illustrated. This pattern is similar to that illustrated in FIG. 3, except that the target pixel is closer to Y1 than X1. The edge is detected between pixels Y1 and Z1. Since the target pixel is located between two level pixels and toward the edge, a two-tap polyphase filter is applied to the level pixels X1 and Y1. This case is determined by the Boolean expression:

(Level_W1X1 && Level_X1Y1 && Edge_Y1Z1)
&& (fy>Midpoint)

Referring to FIG. 5, a fourth pattern is illustrated. In the present pattern, the target pixel is closer to X1 tan Y1 and an edge is detected between pixels W1 and X1. Similarly to the case illustrated with reference to FIG. 4, since the target pixel is located between two level pixels and toward the edge, a two-tap polyphase filter is applied to the level pixels X1 and Y1. This case is determined by the Boolean expresssion:

(Edge_W1X1 && Level_X1Y1 && Level_Y1Z1)
&& (fy<=Midpoint)

Referring to FIG. 6, a fifth pattern is illustrated generally. In the present patter the target pixel is closer to Y1 than X1 and an edge is detected between pixels W1 and X1. Similarly to the case illustrated with reference to FIG. 4, since the target pixel is located between two level pixels and away from the edge, a three-tap polyphase filter is applied to the level pixels X1, Y1, and Z1. This case is determined by the Boolean expresssion:

(Edge_W1X1 && Level_X1Y1 && Level_Y1Z1)
&& (fy>Midpoint)

Referring to FIG. 7, a sixth pattern is illustrated. In the present pattern, edges are detected between W1 and X1 and Y1 and Z1. Since X1 and Y1 are level and both are beside an edge, a two-tap polyphase is applied to them regardless of whether the target pixel is closer to X1 or Y1. This case is determined by the Boolean expresssion:

Edge_W1X1 && Level_X1Y1 && Edge_Y1Z1

Referring to FIG. 8, a seventh pattern is illustrated. In the present pattern, edges are detected between pixels X1 and Y1, Y1 and Z1, and Y1 and Y2. A level is detected between Y1 and X2. The pixels are "don't care" pixels, mug the result for this case will be the same regardless of their condition. Furthermore, the current target pixel is closer to X1 than the immediately previous target pixel. Y1 is preserved by applying a four-tap filter at the last phase. The last phase of the polyphase filter is designed to replicate the pixel Y1, which in the case of vertical filtering is the source pixel immediately below the target pixel. The zeroth phase of the polyphase filter is designed so that it replicates the value of the source pixel X1, which in the case of vertical filtering is the source pixel immediately above the target pixel. This case is determined by the Boolean expression:

Edge_X1Y1 && Edge_Y1Z1 && Edge_Y1Y2 &&
Level_Y1X2 && !((Ystep>=FyBehind) &&
(FyBehind>fy))

Referring to FIG. 9, an eighth is illustrated. The present pattern is similar to that illustrated in FIG. 8, except that the immediately previous target pixel is closer than the current target pixel to X1. In this case, a four-tap filter is applied to W1, X1, Y1, and Z1. This case is determined by the Boolean expression:

Edge_X1Y1 && Edge_Y1Z1 && Edge_Y1Y2 &&
Level_Y1X2 &&((Ystep>=FyBehind) &&
(FyBehind>fy))

Referring to FIG. 10, a ninth pattern is illustrated. The present pattern is similar to FIG. 8, except that the edge has a different orientation. In the present example, edges are detected between pixels X1 and Y1, Y1 and Z1, and Y1 and Y0. A level is detected between Y1 and X0. Furthermore, as in FIG. 8, the current target pixel is closer to X1 than the immediately previous target pixel. Y1 is preserved by applying a four-tap filter at the last phase. This case is determined by the Boolean expression:

Edge_X1Y1 && Edge_Y1Z1 && Edge_Y1Y0 &&
      Level_Y1X0 && !((Ystep>=FyBehind) &&
      (FyBehind>fy))

Figure 11:
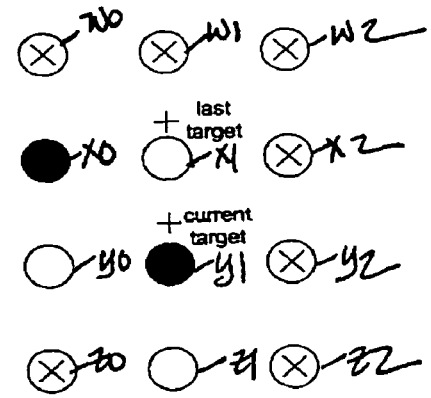

Referring to FIG. 11, a tenth pattern is illustrated. The present pattern is similar to that illustrated in FIG. 10, except that the immediately previous target pixel is closer to X1 than the current target pixel. In this case, a four-tap filter is applied to W1, X1, Y1, and Z1. This case is determined by the Boolean expression:

Edge_X1Y1 && Edge_Y1Z1 && Edge_Y1Y0 &&
      Level_Y1X0 && ((Ystep>=FyBehind) &&
      (FyBehind>fy))

Figure 12:

Referring to FIG. 12, an eleventh pattern is illustrated. In the present pattern, edges are detected between X1 and Y1, and Y1 and Z1. Furthermore, the current target pixel is closer to Y1 than the next target pixel. Y1 is preserved by applying a four-tap filter at the last phase. This case is determined by the Boolean expression:

Edge_X1Y1 && edge_Y1Z1 && ((Fy+
      Ystep>=One) && !(One-Fy>FyAhead))

Figure 13:

Referring to FIG. 13, a twelfth pattern is illustrated. The present pattern is similar to FIG. 12 except that the current target pixel is compared with the previous target pixel. In this case, the current target pixel is closer to X1 than the previous target pixel, and the previous target pixel lies between W1 and X1. X1 is preserved by applying a four-tap filter at the 0th phase. This case is determined by the Boolean expression:

Edge_X1Y1 && Edge_Y1Z1 && Up_X1Y1 &&
      ((Ystep>=FyBehind) && (FyBehind>fy))

Figure 14:
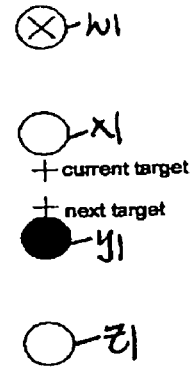

Referring to FIG. 14, a thirteenth pattern is illustrated. The present pattern is similar to FIG. 12 except that both the current target pixel and the next target pixel fall between X1 and Y1, X1 is preserved by applying a four-tap filter at the 0th phase. This rule only applies if hybrid filtering is on. This case is determined by the Boolean expression:

Edge_X1Y1 && Edge_Y1Z1 && !(Fy+
      Ystep>=One) && HybridFiltering

Figure 15:
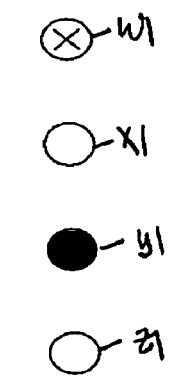

Referring to FIG. 15, a fourteenth pattern is illustrated. The present pattern is similar to FIGS. 8 to 14 in that an edge is detected between pixels X1 and Y1, and Y1 and Z1. If none of the cases illustrated in FIGS. 8 to 14 are matched then a 4-tap filter is applied to pixels W1, X1, Y1, and Z1. This case is determined by the Boolean expression:

Edge_X1Y1 && Edge_Y1Z1

Figure 16:

Referring to FIG. 16, a fifteenth pattern is illustrated. In the present pattern, an edge is detected between W1 and X1 and X1 and Y1, and Y1 and Z1 are level. Also, the current target pixel is closer to X1 than the previous target pixel. X1 is preserved by applying a four-tap filter at the 0th phase. This case is determined by the Boolean expression:

Edge_W1X1 && Edge_X1Y1 &&
      ((Ystep>=FyBehind) && (FyBehind>fy))

Figure 17:
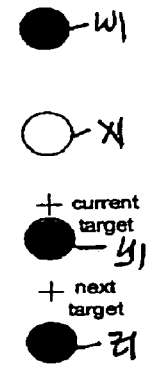

Referring to FIG. 17, a sixteenth pattern is illustrated. In the present pattern, an edge is detected between W1 and X1, and X1 and Y1, and Y1 and Z1 are level. Pixel X1 is lighter than Y1. The current target pixel is closer than the next target pixel to Y1. Y1 is preserved by applying a four-tap filter at the last phase. This case is determined by the Boolean expression:

Edge_W1X1 && Edge_X1Y1 && Down_X1Y1 &&
      ((Fy+Ystep>=One) && !(One-Fy>FyAhead))

Figures 18, 19, 20, 21, 22, 23:
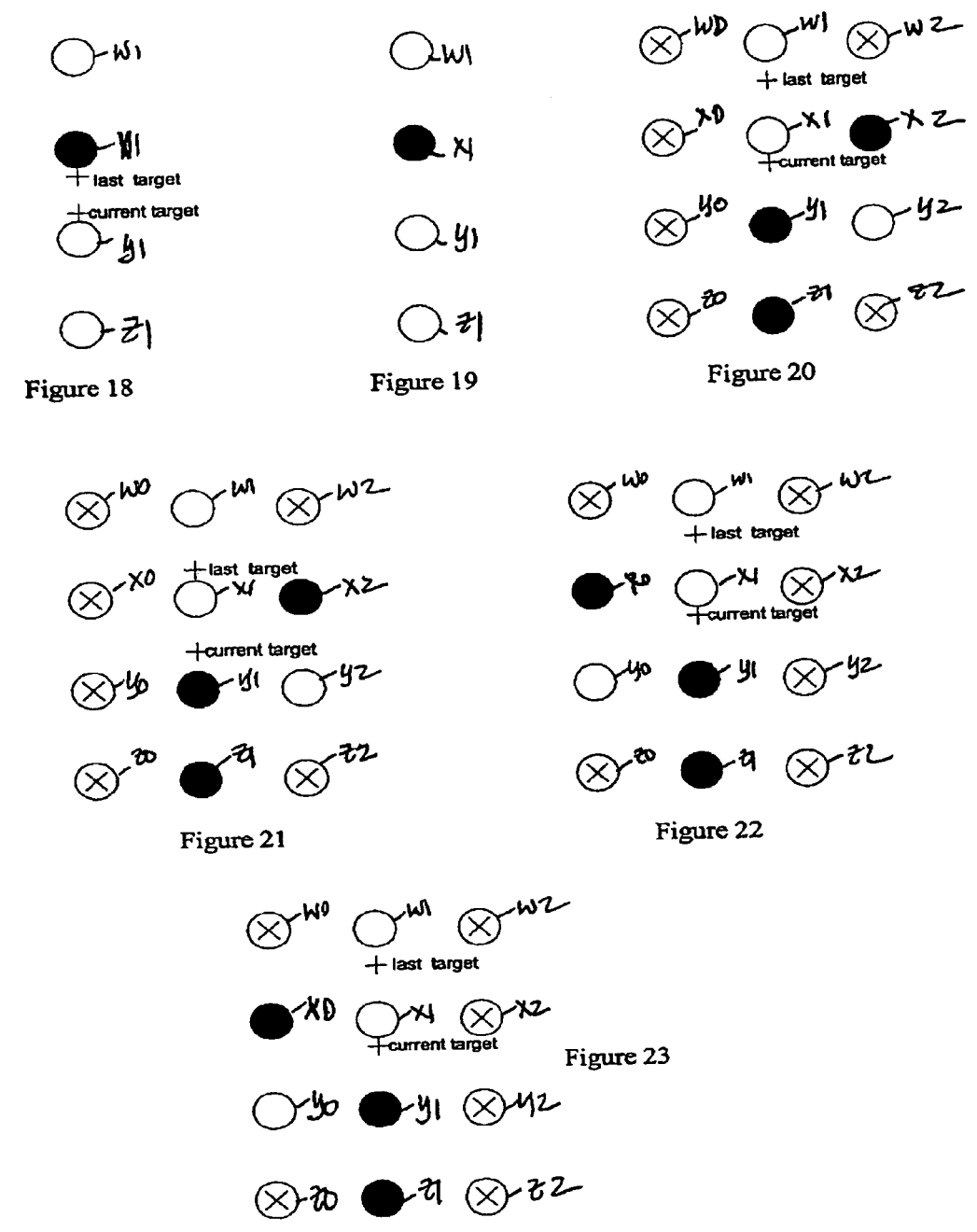

Referring to FIG. 18, an seventeenth pattern is illustrated. In the present pattern, an edge is detected between W1 and X1, and X1 and Y1, and Y1 and Z1 are level. Both the current target pixel and the previous target pixel fall between X1 and Y1 and hybrid filtering is on. Y1 is preserved by applying a four-tap filter at the nth phase. This case is determined by the Boolean expression:

Edge_W1X1 && Edge_X1Y1 &&
      (Ystep>=FyBehind) && (FyBehind>fy) &&
      HybridFiltering Referring to FIG. 19, a eighteenth pattern is illustrated. In the present pattern an edge is detected between W1 and X1, and X1 and Y1, and Y1 and Z1 are level. If none of the cases illustrated in FIGS. 16 to 18 are matched then a 4-tap filter is applied to pixels W1, X1, Y1, and Z1. This case is determined by the Boolean expression:

Edge_W1X1 && Edge_X1Y1

Referring to FIG. 20, a nineteenth pattern is illustrated. In the present pattern, an edge is detected between pixels X1 and Y1, Y1 and Y2, and a level is detected W1 and X1, Y1 and Z1, and Y1 and X2. Either the previous target pixel is closer than the current target pixel to X1 or the previous pixel does not lie between W1 and X1. Y1 is preserved by applying a four-tap filter at the last phase. This case is determined by the Boolean expression:

Edge_X1Y1 && Edge_Y1Y2 && Level_W1X1 &&
      Level_Y1Z1 && Level Y1X2 && !((Ystep>=
      FyBehind) && (FyBehind>fy))

Referring to FIG. 21, a twentieth pattern is illustrated. The pattern is similar to that illustrated in FIG. 20 except that current target pixel is closer than the previous target pixel to X1. A four-tap filter is applied to pixels W1, X1, Y1, and Z1. This case is determined by the Boolean expression:

Edge_X1Y1 && Edge_Y1Y2 && Level_W1X1 &&
      Level_Y1Z1 && Level Y1X2 &&
      ((Ystep>=FyBehind) && (FyBehind>fy))

Referring to FIG. 22, a twenty-first pattern is illustrated. In the present pattern, an edge is detected between X1 and Y1, and Y1 and Y0. A level is detected between W1 and X1, Y1 and Z1, and Y1 and X0. Either the previous target pixel is closer than the current target pixel to X1 or the previous pixel does not lie between W1 and X1. Y1 is preserved by applying a four-tap filter at the last phase. This case is determined by the Boolean expression:

Edge_X1Y1 && Edge_Y1Y0 && Level_W1X1 &&
      Level_Y1Z1 && Level Y1X0 && !((Ystep>=
      FyBehind) && (FyBehind>fy))

Referring to FIG. 23, a twenty-second pattern is illustrated. The pattern is similar to that illustrated in FIG. 22 except that the current target pixel is closer than the previous target pixel to X1. A four-tap filter is applied to pixels W1, X1, Y1, and Z1. This case is determined by the Boolean expression:

Edge_X1Y1 && Edge_Y1Y0 && Level_W1X1 &&
      Level_Y1Z1 && Level Y1X0 &&
      ((Ystep>=FyBehind) && (FyBehind>fy))

Referring to FIG. 24, a twenty-third pattern is illustrated. In the present pattern, a level is detected between pixels W1 and X1, and Y1 and Z1. An edge is detected between X1 and Y1. Pixels W1 and X1 are darker than Y1 and Z1. The current target pixel is closer than the previous target pixel to X1. X1 is preserved by applying a for-tap filter at the 0th phase. This case is determined by the Boolean expression:

Edge_X1Y1 && Level_W1X1 && Level_Y1Z1
    && Up_X1Y1 && ((Ystep>=FyBehind) &&
    (FyBehind>fy))

Referring to FIG. 25, a twenty-fourth pattern is illustrated. In the present pattern a level is detected between pixels W1 and X1, and Y1 and Z1. An edge is detected between X1 and Y1. Pixels W1 and X1 are lighter than Y1 and Z1 The current target pixel is closer than the next target pixel to Y1. Y1 is preserved by applying a four-tap filter at the last phase. This case is determined by the Boolean expression:

Edge_X1Y1 && Level_W1X1 && Level_Y1Z1
    && Down_X1Y1 && (Fy+Ystep>=One)
    && !(One−fy>FyAhead)

Referring to FIG. 26, a twenty-fifth pattern is illustrated. The present patter is similar to the pattern illustrated in FIG. 24, except that both the current target pixel and previous target pixel are located between X1 and Y1. This pattern is only implement is hybrid filtering is on. Y1 is preserved by applying a four-tap filter at the last phase. This case is determined by the Boolean expression:

Edge_X1Y1 && Level_W1X1 && Level_Y1Z1
    && Up_X1Y1 && !(Ystep>=FyBehind) &&
    HybridFiltering Referring to FIG. 27, a twenty-sixth pattern is illustrated. The present pattern is similar to that illustrated in FIG. 25, except that both the current target pixel and next target pixel are located between X1 and Y1. This pattern is only implement is hybrid filtering is on. X1 is preserved by applying a four-tap filter at the 0th phase. This case is determined by the Boolean expression:

Edge_X1Y1 && Level_W1X1 && Level_Y1Z1
    && Down_X1Y1 && !(Fy+Ystep>=One) &&
    HybridFiltering Referring to FIG. 28, a twenty-seventh pattern is illustrated. In the present pattern, a level is detected between pixels W1 and X1, and Y1 and Z1. An edge is detected between X1 and Y1. Pixels W1 and X1 are lighter than Y1 and Z1. Also, none of the patters illustrated in FIGS. 20–27 are a match. A four-tap filter is applied to pixels W1, X1, Y1, and Z1. This case is determined by the Boolean expression:

Edge_X1Y1 && Level_W1X1 && Level_Y1Z1 &&
    Down_X1Y1

In the case that none of the above patterns are matched, four-tap filter is applied to pixels W1, X1, Y1, and Z1.

It can be seen from the above cases that many of the patterns contain similar elements. Therefore, in order to improve implementation speed and simplicity, elements can be grouped and defined in accordance as illustrated in Table 1 below.

TABLE 1

| Boolean Variable Name | Expression |
|---|---|
| C1 | Level_w1x1 && edge_x1y1 level_y1z1 |
| C2 | FyBehind > fy |
| C3 | Ystep >= fyBehind |
| C4 | Fy + ystep >= one |
| C5 | One − fy > fyAhead |
| C6 | Fy <= midpoint |

TABLE 1-continued

| Boolean Variable Name | Expression |
|---|---|
| C7 | Down_x1y1 |
| C8 | Up_x1y1 |
| C9 | Level_w1x1 && level_x1y1 && level_y1z1 |
| C10 | Edge_w1x1 && level_x1y1 && level_y1z1 |
| C11 | Level_w1x1 && level_x1y1 && edge_y1z1 |
| C12 | Edge_w1x1 && level_x1y1 && edge_y1z1 |
| C13 | Edge_w1x1 && edge_x1y1 |
| C14 | Edge_x1y1 && edge_y1z1 |
| C15 | Level_y1x2 |
| C16 | Level_y1x0 |
| C17 | Edge_y1z1 |
| C18 | Edge_y1y2 |
| C19 | Edge_y1y0 |
| C20 | HybridFiltering |

These Boolean variables can then be grouped to provide the 27 patterns illustrated in FIGS. 2 to 28. A summary of these patterns and the resulting filter configuration is provided in Table 2 below.

TABLE 2

| Pattern # | Condition | Action |
|---|---|---|
| 1 | C9 | Apply a four-tap polyphase filter on w1, x1, y1, and z1 |
| 2 | C11 && c6 | Apply a three-tap polyphase filter on w1, x1, and y1 |
| 3 | C11 && !c6 | Apply a two-tap polyphase filter on x1 and y1 |
| 4 | C10 && c6 | Apply a two-tap polyphase filter on x1 and y1 |
| 5 | C10 && !c6 | Apply a three-tap polyphase filter on x1, y1, and z1 |
| 6 | C12 | Apply a two-tap polyphase filter on x1 and y1 |
| 7 | C14 && c15 && c18 && !(c2 && c3) | Preserve y1 (apply four-tap polyphase filter at last phase) |
| 8 | C14 && c15 && c18 && (c2 && c3) | Apply a four-tap polyphase filter on w1, x1, y1, and z1 |
| 9 | C14 && c16 && c19 && !(c2 && c3) | Preserve y1 (apply four-tap polyphase filter at last phase) |
| 10 | C14 && c16 && c19 && (c2 && c3) | Apply a four-tap polyphase filter on w1, x1, y1, and z1 |
| 11 | C14 && c4 && !c5 | Preserve y1 (apply four-tap polyphase filter at last phase) |
| 12 | C14 && c8 && c2 && c3 | Preserve x1 (apply four-tap polyphase filter at 0th phase) |
| 13 | C14 && !c4 && c20 | Preserve x1 (apply four-tap polyphase filter at 0th phase) |
| 14 | C14 | Apply a four-tap polyphase filter on w1, x1, y1, and z1 |
| 15 | C13 && c2 && c3 | Preserve x1 (apply four-tap polyphase filter at 0th phase) |
| 16 | C13 && c7 && c4 && !c5 | Preserve y1 (apply four-tap polyphase filter at last phase) |
| 17 | C13 && !c3 && c20 | Preserve y1 (apply four-tap polyphase filter at last phase) |
| 18 | C13 | Apply a four-tap polyphase filter on w1, x1, y1, and z1 |
| 19 | C1 && c15 && c18 && !(c2 && c3) | Preserve y1 (apply four-tap polyphase filter at last phase) |
| 20 | C1 && c15 && c18 && (c2 && c3) | Apply a four-tap polyphase filter on w1, x1, y1, and z1 |
| 21 | C1 && c16 && c19 && !(c2 && c3) | Preserve y1 (apply four-tap polyphase filter at last phase) |
| 22 | C1 && c16 && c19 && (c2 && c3) | Apply a four-tap polyphase filter on w1, x1, y1, and z1 |
| 23 | C1 && c2 && c3 && c8 | Preserve x1 (apply four-tap polyphase filter at 0th phase) |
| 24 | C1 && c4 && !c5 && c7 | Preserve y1 (apply four-tap polyphase filter at last phase) |

TABLE 2-continued

| Pattern # | Condition | Action |
|---|---|---|
| 25 | C1 && c8 && !c3 && c20 | Preserve y1 (apply four-tap polyphase filter at last phase) |
| 26 | C1 && c7 && !c4 && c20 | Preserve x1 (apply four-tap polyphase filter at 0th phase) |
| 27 | C1 | Apply a four-tap polyphase filter on w1, x1, y1, and z1 |
| 28 | Default Case (All of the above are false) | Apply a four-tap polyphase filter on w1, x1, y1, and z1 |

Figure 29:
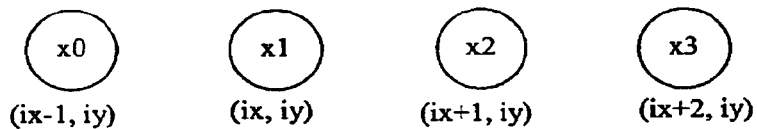
FIG. 29 is a block diagram of a pixel window for use in horizontal interpolation of a target pixel.

Referring to FIG. 29, a decision window for horizontal ANN is illustrated the window comprises a row of four pixels. The row is represented as the X row from the decision window for vertical interpolation. Depending on patterns detected in the decision window, a filter is applied in one of several configurations. These configurations include preserving X1, preserving X2, applying a two-tap polyphase filter on X1 and X2, applying a three-tap polyphase filter on X0, X1, and X2, applying a three-tap polyphase filter on X1, X2, and X3, and applying a four-tap polyphase filter on X0, X1, X2, and X3.

Variables are defined for the horizontal interpolation that are similar to those described for the vertical interpolation. For example, Xstep, FxAhead, FxBehind, Up_X1X2, have a similar definition as the correlated y-component variables. The following algorithm describes predefined patterns against which the decision window is compared as well and the resulting filter configuration that is selected for each case. Due to the way in which the algorithm is implemented (case-like structure), the order of the patterns can be significant. Therefore, it is preferable that they are compared with the decision window in the order as listed below.

Figure 30:
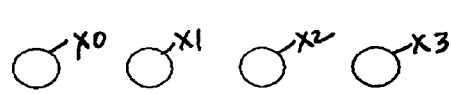
FIGS. 30–48 are block diagrams illustrating select predetermined patterns possible within the pixel window illustrated in figure X.

Referring to FIG. 30, a first pattern is illustrated. All four pixels are level. A four-tap filter is used pixels W1, X1, Y1, and Z1. This case is determined by the Boolean expression:

Level_X0X1 && Level_X1X2 && Level_X2X3

Figure 31:
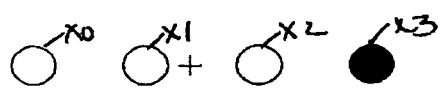

Referring to FIG. 31, a second pattern is illustrate. In the present pattern, and edge is detected between X2 and X3 and a level is detected between X0 and X1, and X1 and X2. The target pixel is closer to X1 tan X2. A three-tap polyphase filter is applied to the 3 level pixels, X0, X1, and X2.

This case is determined by the Boolean expression:

Level_X0X1 && Level_X1X2 && Edge_X2X3 && Fx<=Midpoint

Figure 32:
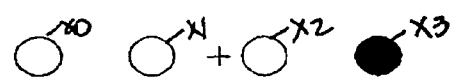

Referring to FIG. 32, a third pattern is illustrated. This pattern is similar to that illustrated in FIG. 31, except that the target pixel is closer to X2 than X1. A two-tap polyphase filter is applied to the two middle pixels, X1 and X2. This case is determined by the Boolean expression:

Level_X0X1 && Level_X1X2 && Edge_X2X3 && Fx>Midpoint

Figure 33:
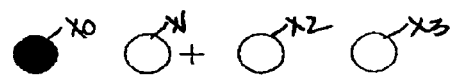

Referring to FIG. 33, a fourth pattern is illustrated. In the present pattern, and edge is detected between X0 and X1, and a level is detected between X1 and X2, and X2 and X3. The target pixel is closer to X1 than X2. A two-tap polyphase filter is applied to the two middle pixels, X1 and X2. This case is determined by the Boolean expression:

Edge_X0X1 && Level_X1X2 && Level_X2X3 && Fx<=Midpoint

Figure 34:
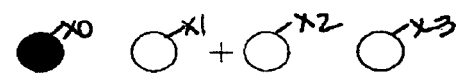

Referring to FIG. 34, a fifth pattern is illustrated. This pattern is similar to that illustrated in FIG. 33, except that the target pixel is closer to X2 than X1. A tree-tap polyphase filter is applied to the level pixels, X1, X2, and X3. This case is determined by the Boolean expression:

Edge_X0X1 && Level_X1X2 && Level X2X3 && Fx>Midpoint

Figure 35:
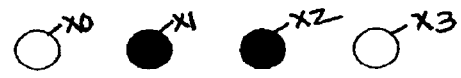

Referring to FIG. 35, a sixth pattern is illustrated. In the present pattern, an edge is detected between X0 and X1, and X2 and X3 and a level is detected between X1 and X2. A two-tap polyphase filter is applied to the 2 middle pixels, X1 and X2. This case is determined by the Boolean expression:

Edge_X0X1 && Level_X1X2 && Edge_X2X3

Figure 36:

Referring to FIG. 36, a seventh pattern is illustrated. In the present pattern an edge is detected between pixels X1 and X2, and X2 and X3. The current target pixel is closer than the next target pixel to X2, and the next target pixel lies between X2 and X3. X2 is preserved by applying a four-tap filter at the last phase. The last phase of the polyphase filter is designed to replicate the pixel X2, which in the case of vertical filtering is the source pixel immediately to the right of the target pixel. The zeroth phase of the polyphase filter is designed so that it replicates the value of the source pixel X1, which in the case of vertical filtering is the source pixel immediately to the left of the target pixel. This case is determined by the Boolean expression:

Edge_X1X2 && Edge_X2X3 && (fx+xstep>=one) && (one−fx<Ahead)

Figure 37:

Referring to FIG. 37, an eighth pattern is illustrated. The pattern is similar to that illustrated in FIG. 36, except that the current target pixel is closer than the previous target pixel to X1. This pattern is only applied when X2 is lighter Dan X1. X1 is preserved by applying a four-tap filter at the 0th phase. This case is determined by the Boolean expression:

Edge_X1X2 && Edge_X2X3 && Up_X1X2 && (Xstep>=FxBehind) && (FxBehind>Fx)

Figure 38:
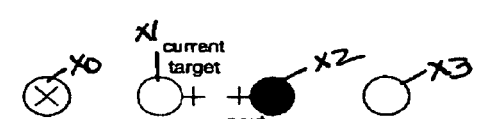

Referring to FIG. 38, a ninth pattern is illustrated. The pattern is similar to that illustrated in FIG. 36, except tat the current target pixel and the next target pixel both lie between X1 and X2. This pattern only applies when hybrid filtering is on. X1 is preserved by applying a four-tap filter at the 0th phase. This case is determined by the Boolean expression:

Edge_X1X2 && Edge_X2X3 && (fx+xstep<one) && HybridFiltering

Figure 39:
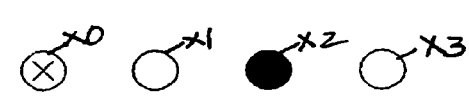

Referring to FIG. 39, a tenth pattern is illustrated. The pattern is applied if an edge is detected between pixels X1 and X2, and X2 and X3, and none of the patterns illustrated in FIGS. 6–8 are a match. A four-tap filter is applied to pixels X0, X1, X2, and X3. This case is determined by the Boolean expression:

Edge_X1X2 && Edge_X2X3

Figure 40:
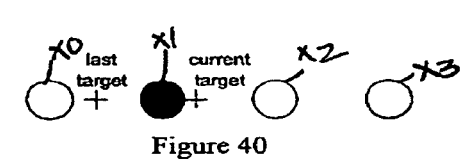

Referring to FIG. 40, an eleventh pattern is illustrated. In the present pattern, an edge is detected between X0 and X1, and between X1 and X2, and X2 and X3 are level. The current target is closer than the previous target to X1. X1 is preserved by applying a four-tap filter at the 0th phase. This case is determined by the Boolean expression:

Edge_X0X1 && Edge_X1X2 && (Xstep>=FxBehind) && (FxBehind>Fx)

Figure 41:
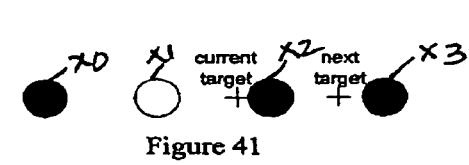

Referring to FIG. 41, a twelfth pattern is illustrated. In the present patter, an edge is detected between X0 and X1, and between X1 and X2. The current target pixel is closer than the next target pixel to X2. This pattern is only true if X1 is lighter than X2. X2 is preserved by applying a four-tap filter at the last phase. This case is determined by the Boolean expression:

Edge_X0X1 && Edge_X1X2 && !Up_X1X2 &&
(fx+xstep>=one) && (one−fx=<fxAhead)

Figure 42:
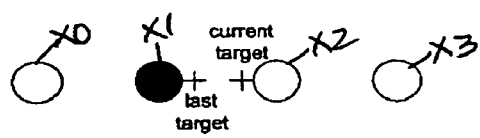

Referring to FIG. 42, a thirteenth pattern is illustrated. The present pattern is similar to the pattern illustrated in FIG. 40, except that the current target pixel and the previous target pixel both lie between X1 and X2. X2 is preserved by applying a four-tap filter at the last phase. This case is determined by the Boolean expression:

Edge_X0X1 && Edge_X1X2 && !(Xstep>=
FxBehind) && Hybrid Filtering

Figure 43:

Referring to FIG. 43, a fourteenth pattern is illustrated. In the present patter an edge is detected between X0 and X1, and between X1 and X2. None of the patterns illustrated in FIGS. 40–42 are a match. A four-tap filter is applied to pixels X0, X1, X2, and X3. This case is determined by the Boolean expression:

Edge_X0X1 && Edge_X1X2

Figure 44:

Referring to FIG. 44, a fifteenth pattern is illustrated. In the present pattern, a level is detected between pixels X0 and X1, and X2 and X3, and an edge is detected between pixels X1 and X2. The current target pixel is closer than the next target pixel to X2 and pixels X0 and X1 are lighter than pixels X2 and X3. X2 is preserved by applying a four-tap filter at the last phase. This case is determined by the Boolean expression:

Level_X0X1 && Edge_X1X2 && Level_X2X3 &&
(fx+xstep>=one) && (one−fx=<fxAhead)
&& !Up_X1X2

Figure 45:

Referring to FIG. 45, a sixteenth pattern is illustrated. In the present pattern, a level is detected between pixels X0 and X1, and X2 and X3, and an edge is detected between pixels X1 and X2. The current target pixel is closer than the previous target pixel to X1 and pixels X0 and X1 are darker than pixels X2 and X3. X1 is preserved by applying a four-tap filter at the 0th phase. This case is determined by the Boolean expression:

Level_X0X1 && Edge_X1X2 && Level_X2X3 &&
(Xstep>=FxBehind) && (FxBehind>Fx) &&
Up_X1X2

Figure 46:
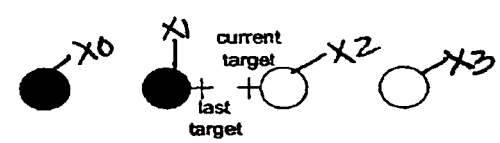
Figure 47:
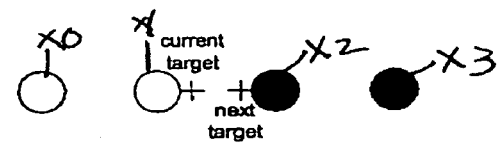
Figure 48:
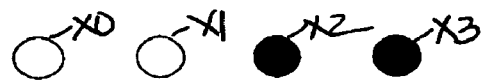

Referring to FIG. 46, a seventeenth pattern is illustrated. This pattern is similar to the pattern described in FIG. 45, except that both the current target pixel and the previous target pixel lie between X1 and X2 This pattern is only true if hybrid filtering is selected. X2 is preserved by applying a four-tap filter at the last phase. This case is determined by the Boolean expression:

Level_X0X1 && Edge_X1X2 && Level_
X2X3 !(Xstep>=FxBehind) && Up_X1X2 &&
HybridFiltering Referring to FIG. 47, an eighteenth pattern is illustrated. This pattern is similar to the pattern described in FIG. 44, except that both the current target pixel and the next target pixel lie between X1 and X2. This pattern is only true if hybrid filtering is selected. X1 is preserved by applying a four-tap filter at the 0th phase. This case is determined by the Boolean expression:

Level_X0X1 && Edge_X1X2 && Level_X2X3
&& !(fx xstep>=one) && !Up_X1X2 &&
HybridFiltering Referring to FIG. 48, a nineteenth pattern is illustrated. In the present pattern a level is detected between pixels X0 and X1, and X2 and X3, and an edge is detected between pixels X1 and X2. None of the patterns illustrated in FIGS. 44–47 are a match. A four-tap filter is applied to pixels X0, X1, X2, and X3. This case is determined by the Boolean expression:

Level_X0X1 && Edge_X1X2 && Level_X2X3

In the event that none of the above patterns are matched, a four-tap filter is applied to pixels X0, X1, X2, and X3

It can be seen from the above cases that many of the patterns contain similar elements. Therefore, in order to improve implementation speed and simplicity, elements can be grouped and defined in accordance as illustrated in Table 3 below.

TABLE 3

| Boolean Variable Name | Expression |
| --- | --- |
| up x1x2 | x1 < x2 (Comparing green value of the 2 pixels) |
| c1 | edge_x0x1 && edge_x1x2 |
| c2 | edge_x0x1 && level_x1x2 && edge_x2x3 |
| c3 | edge_x0x1 && level_x1x2 && level_x2x3 |
| c4 | edge_x1x2 && edge_x2x3 |
| c5 | level_x0x1 && edge_x1x2 && level_x2x3 |
| c6 | level_x0x1 && level_x1x2 && edge_x2x3 |
| c7 | level_x0x1 && level_x1x2 && level_x2x3 |
| c8 | fx +xstep >= one |
| c9 | xstep >= fxBehind |
| c10 | one − fx > fxAhead |
| c11 | fxBehind > fx |
| c12 | fx <= midpoint |
| c13 | up_x1x2 |
| c14 | HybridFiltering |

These Boolean variables can then be grouped to provide the 19 patterns illustrated in FIGS. 30 to 38. A summary of these patterns and tee resulting filter configuration is provided in Table 4 below.

TABLE 4

| Pattern # | Condition | Action |
| --- | --- | --- |
| 1 | c7 | Apply a four-tap polyphase filter on x0, x1, x2, and x3 |
| 2 | c6 && c12 | Apply a three-tap polyphase filter on x0, x1, and x2 |
| 3 | c6 && !c12 | Apply a two-tap polyphase filter on x1 and x2 |
| 4 | c3 && c12 | Apply a two-tap polyphase filter on x1 and x2 |
| 5 | c3 && !c12 | Apply a three-tap polyphase filter on x1, x2, and x3 |
| 6 | c2 | Apply a two-tap polyphase filter on x1 and x2 |
| 7 | c4 && c8 && !c10 | Preserve x2 (apply four-tap polyphase filter at last phase |
| 8 | c4 && c13 && c9 && c11 | Preserve x1 (apply four-tap polyphase filter at 0th phase |
| 9 | c4 && !c8 && c14 | Preserve x1 (apply four-tap polyphase filter at 0th phase) |
| 10 | c4 | Apply a four-tap polyphase filter on x0, x1, x2, and x3 |
| 11 | c1 && c9 && c11 | Preserve x1 (apply four-tap polyphase filter at 0th phase) |
| 12 | c1 && !c13 && c8 && !c10 | Preserve x2 (apply four-tap polyphase filter at last phase) |
| 13 | c1 && !c9 && c14 | Preserve x2 (apply four-tap polyphase filter at last phase) |
| 14 | c1 | Apply a four-tap polyphase filter on x0, x1, x2, and x3 |

TABLE 4-continued

| Pattern # | Condition | Action |
|---|---|---|
| 15 | c5 && c8 && !c10 && !c13 | Preserve x2 (apply four-tap polyphase filter at last phase) |
| 16 | c5 && c9 && c11 && c13 | Preserve x1 (apply four-tap polyphase filter at 0th phase) |
| 17 | c5 && c13 && !c9 && c14 | Preserve x2 (apply four-tap polyphase filter at last phase) |
| 18 | c5 && !c13 && !c8 && c14 | Preserve x1 (apply four-tap polyphase filter at 0th phase) |
| 19 | c5 | Apply a four-tap polyphase filter on x0, x1, x2, and x3 |
| 20 | Default Case (When all of the above are false) | Apply a four-tap polyphase filter on x0, x1, x2, and x3 |

Although the invention has been described with reference to certain specific embodiments, various modifications thereof will be apparent to those skilled in the art without departing from the spirit and scope of the invention as outlined in the claims appended hereto.

The invention claimed is:

1. A method for interpolating a target pixel from a plurality of source pixels in a high contrast image, said method comprising the steps of:
   a) examining a window of said plurality of source pixels;
   b) comparing pixels in said window with a plurality of predefined conditions in a predefined order for determining if a structure of significance is present within said window;
   c) selecting a filter configuration from a plurality of filter configurations in accordance with results of said comparison; and
   d) applying said selected filter for interpolating said target pixel, wherein if said structure of significance is detected in said window, said selected filter best preserves said structure.

2. A method as defined in claim 1, wherein said filter is selected further in accordance with a position of previously determined target pixel.

3. A method as defined in claim 1, wherein said filter is selected further in accordance with a position of a following target pixel.

4. A method as for interpolating a target pixel from a plurality of source pixels in a high contrast image, said method comprising the steps of:
   (a) examining a window of said plurality of source pixels;
   (b) comparing pixels in said window with a plurality of predefined conditions in a predefined order for determining if a structure of significance is present within said window;
   (c) selecting a filter configuration from a plurality of filter configurations in accordance with results of said comparison; and
   (d) applying said selected filter for interpolating said target pixel,
   wherein if said structure of significance is detected in said window, said selected filter best preserves said structure; and
   wherein said pixel values are compared in accordance with corresponding surrogate luminance values.

5. A method as defined in claim 4, wherein said filter is selected further in accordance with a position of previously determined target pixel.

6. A method as defined in claim 4, wherein said filter is selected further in accordance with a position of a following target pixel.

7. A method for scaling an image including a plurality of source pixels, comprising:
   determining a structure in the image by comparing source pixels to predefined conditions in a predefined order;
   adaptively selecting a filter tap responsive to the determining; and
   calculating a target pixel by manipulating source pixels with the selected filter tap.

8. The method of claim 7 where adaptively selecting includes adaptively selecting the filter in accordance with a position of previously determined target pixel.

9. The method of claim 7 where adaptively selecting includes adaptively selecting the filter in accordance with a position of a following target pixel.

10. A method for scaling an image including a plurality of source pixels, comprising:
    determining a structure in the image by comparing source pixels to predefined conditions in a predefined order;
    adaptively selecting a filter tap responsive to the determining; and
    calculating a target pixel by manipulating source pixels with the selected filter tap;
    where determining includes comparing corresponding surrogate luminance values of the source pixels.

11. The method of claim 10 where adaptively selecting includes adaptively selecting the filter in accordance with a position of previously determined target pixel.

12. The method of claim 10 where adaptively selecting includes adaptively selecting the filter in accordance with a position of a following target pixel.

* * * * *

UNITED STATES PATENT AND TRADEMARK OFFICE
CERTIFICATE OF CORRECTION

PATENT NO. : 7,142,729 B2
APPLICATION NO. : 10/106060
DATED : November 28, 2006
INVENTOR(S) : Wredenhagen et al.

It is certified that error appears in the above-identified patent and that said Letters Patent is hereby corrected as shown below:

At column 15, line 46, claim 4 Please delete the word "as".

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,142,729 B2 |
| APPLICATION NO. | : 10/106060 |
| DATED | : November 28, 2006 |
| INVENTOR(S) | : Wredenhagen et al. |

It is certified that error appears in the above-identified patent and that said Letters Patent is hereby corrected as shown below:

Please delete the word "as" at column 15, line 46.

Signed and Sealed this

First Day of January, 2008

JON W. DUDAS
*Director of the United States Patent and Trademark Office*